US007509103B2

(12) United States Patent
Ozaki

(10) Patent No.: US 7,509,103 B2
(45) Date of Patent: Mar. 24, 2009

(54) DIGITAL RADIO BROADCASTING RECEIVER AND METHOD OF RECEIVING DIGITAL RADIO BROADCASTING

(75) Inventor: Yukio Ozaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 513 days.

(21) Appl. No.: 11/239,015

(22) Filed: Sep. 30, 2005

(65) Prior Publication Data

US 2006/0079975 A1 Apr. 13, 2006

(30) Foreign Application Priority Data

Oct. 7, 2004 (JP) .......................... P2004-294916

(51) Int. Cl.
*H04B 1/18* (2006.01)

(52) U.S. Cl. .............. 455/186.1; 455/166.2; 455/158.4; 455/158.5; 375/260; 375/343

(58) Field of Classification Search ............. 455/186.1, 455/166.2, 158.4, 158.5; 375/260, 343
See application file for complete search history.

(56) References Cited

U.S. PATENT DOCUMENTS 6,553,077 B2 * 4/2003 Rindsberg et al. ........... 375/260
7,190,938 B2 * 3/2007 Kaneko ................... 455/186.1
7,263,329 B2 * 8/2007 Acker ........................ 455/3.02

FOREIGN PATENT DOCUMENTS

| | | |
|---|---|---|
| JP | 64-62922 | 3/1989 |
| JP | 2-21731 | 1/1990 |
| JP | 4-284725 | 10/1992 |
| JP | 6-268543 | 9/1994 |
| JP | 6-326627 | 11/1994 |
| JP | 8-51379 | 2/1996 |
| JP | 11-145860 | 5/1999 |
| JP | 2000-286729 | 10/2000 |
| JP | 2001-85962 | 3/2001 |

* cited by examiner

*Primary Examiner*—Sanh D Phu
(74) *Attorney, Agent, or Firm*—Oblon, Spivak, McClelland, Maier & Neustadt, P.C.

(57) ABSTRACT

A digital radio broadcasting receiver capable of automatically setting an audio field of reproduced sound in response to a musical genre of an ongoing broadcasting composition is disclosed. Digital radio broadcasting receiver 1 is provided with tuner 2, audio data decoder 3, equalizer 4, parameter memory 5, additional program information decoder 7, genre data selector 8 and control CPU 6. Tuner 2 outputs audio data and additional program information and audio data decoder 3 decodes the audio data. Equalizer 4 adjusts frequency characteristics of the decoded audio data. Parameter memory 5 stores parameters for the frequency characteristics for each musical genre. Additional program data decoder 7 decodes additional program information. Genre data selector 8 selects musical genre data from the additional program information. Parameter memory 5 reads out the parameters to adjust frequency characteristics and provides the same to control CPU 6, which sends the same to equalizer 4.

5 Claims, 3 Drawing Sheets

| GENRE | PARAMETER |
|---|---|
| CLASSIC | PRESET DATA P1 |
| PIANO | PRESET DATA P2 |
| ROCK | PRESET DATA P3 |
| LATIN | PRESET DATA P4 |
| JAZZ | PRESET DATA P5 |
| ⋮ | ⋮ |

| GENRE | PARAMETER |
| --- | --- |
| CLASSIC | USER SETTING DATA U1 |
| PIANO | USER SETTING DATA U2 |
| ROCK | ... |
| LATIN | USER SETTING DATA U4 |
| JAZZ | USER SETTING DATA U5 |
| ⋮ | ⋮ |

DIGITAL RADIO BROADCASTING RECEIVER AND METHOD OF RECEIVING DIGITAL RADIO BROADCASTING

CROSS-REFERENCE OF RELATED APPLICATIONS

This application is based upon and claims the benefit of priority from the prior Japanese Patent Application No. 2004-294916, filed on Oct. 7, 2004, the entire contents of which are incorporated herein by reference.

FIELD OF THE INVENTION

This invention generally relates to a radio receiver and a method of receiving broadcasting programs and, more particularly, to a digital radio broadcasting receiver to receive digital broadcasting programs and reproduce audio signals and a method of receiving digital radio broadcasting programs.

BACKGROUND OF THE INVENTION

Digital broadcast carried out through a broadcasting satellite has been recently started. Terrestrial or ground-wave digital broadcasting has been next planned and a test for putting it into practical use has been in progress. Since those types of digital radio broadcasting provide audio programs of high quality comparable to compact discs, they are especially suitable for musical programs.

Further, audio data as well as additional program information are transmitted in the digital broadcasting. In the case of musical programs, genre information of a transmitting musical composition, its title and performers, etc., can be transmitted as such additional program information. Digital radio receivers can receive the same and indicate such genre information of a transmitted musical composition, its title and performers, etc. on a display device.

In order to make reproduced sounds much better quality, a digital radio broadcasting receiver suitable for musical programs is required to have a special effect device with audio field control functions such as an equalizer. It is further desirable to automatically control this audio field in response to genre information of a transmitting musical composition.

Conventionally, an equalizer of an audio reproduction device has been provided to control audio field characteristics in response to genre information of a musical composition played by a compact disc (see Japanese Unexamined Patent Publication No. 2001-85962, pages 3-5 and FIG. 1). The equalizer analyzes spectra of a part of a musical composition in advance to determine its frequency characteristic, judges its musical genre and automatically sets up equalizer characteristics suitable for the musical genre.

In the case of digital radio broadcasting, however, since contrary to the compact disc, a playing musical composition is transmitted on a real time basis, its frequency characteristics or the like cannot be analyzed in advance.

SUMMARY OF THE INVENTION

A digital radio broadcasting receiver in accordance with one embodiment of the present invention is provided with a selector configured to select data of a musical genre from additional program information, and an audio data decoder configured to reproduce audio suitable for the musical genre in response to the data.

A digital radio broadcasting receiver in accordance with another embodiment of the present invention is provided with a tuner, an audio data decoder, an audio field adjustor, a parameter memory, an additional program information decoder, a genre data selector, and a controller. The tuner is configured to receive digital radio broadcasting programs and to output audio data and additional program information. The audio data decoder decodes the audio data output from the tuner. The audio field adjustor is configured to adjust audio fields of the audio data decoded through the audio data decoder. The parameter memory stores parameters to adjust audio field for each musical genre. The additional program information decoder decodes the additional program information output through the tuner and converts the same into character information. The genre data selector selects a musical genre from the character information provided through the additional program information decoder. The controller is configured to control the parameters read from the parameter memory in response to the musical genre selected by the genre data selector and to send the same to the audio field adjustor.

A method of receiving digital radio broadcasting audio programs and additional program information in accordance with the present invention carries out selecting musical genre data from the additional program information, and reproducing audio data from the audio programs with characteristics suitably adjusted in response to the musical genre data.

A method of receiving digital radio broadcasting in accordance with the present invention carries out receiving digital radio broadcasting programs and outputting audio data and additional program information, decoding the audio data, storing parameters in a parameter memory to adjust audio field for each musical genre, decoding the additional program information and converting the same into character information, selecting a musical genre from the character information, reading the parameters from the parameter memory in response to the musical genre selected, and adjusting the audio field of the audio data decoded in response to the parameters read from the parameter memory.

BRIEF DESCRIPTION OF THE DRAWINGS

A more complete appreciation of the present invention and many of its attendant advantages will be readily obtained as the same becomes better understood by reference to the following detailed descriptions when considered in connection with the accompanying drawings, wherein.

DETAILED DESCRIPTION OF THE INVENTION

Figure 1:
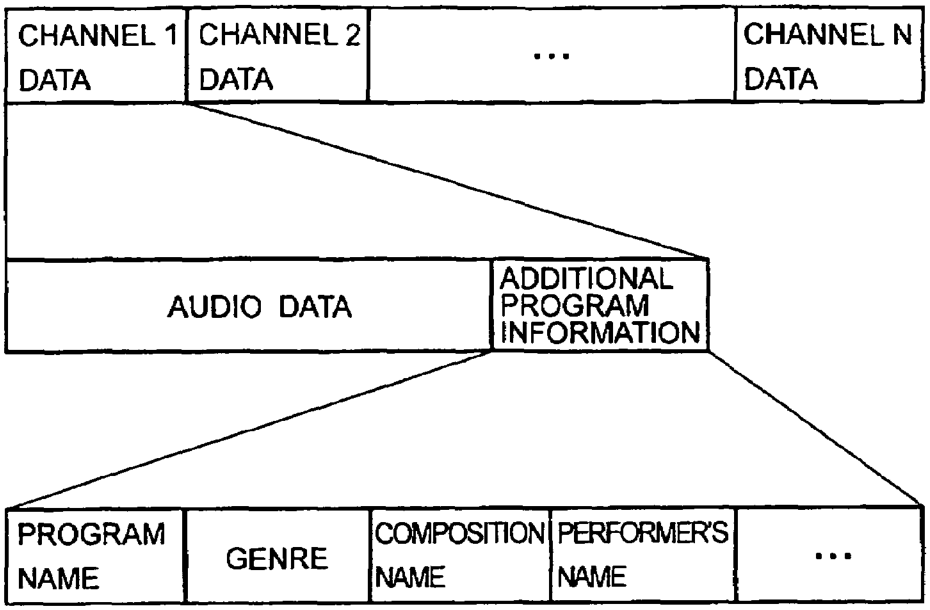
FIG. 1 is a schematic allocation diagram of additional program information transmitted by digital radio broadcasting.

Embodiments of the present invention will be explained below with reference to the attached drawings. It should be noted that the present invention is not limited to the embodiments but covers their equivalents. Throughout the attached drawings, similar or same reference numerals show similar, equivalent or same components. The drawings, however, are shown schematically for the purpose of explanation so that their components are not necessarily the same in shape or dimension as actual ones. In other words, concrete shapes or dimensions of the components should be considered as described in these specifications, not in view of the ones shown in the drawings. Further, some components shown in the drawings may be different in dimension or ratio from each other.

First Embodiment

FIG. 1 is a schematic allocation diagram of additional program information transmitted by digital radio broadcasting.

The digital radio broadcasting transmits a radio broadcasting signal per frame in which a plurality of channels are multiplexed as shown in FIG. 1. A channel is composed of audio data and additional program information. The additional program information includes data of a program title, a musical genre of a transmitting composition, a title and performers of the composition, etc., in the case of a musical program, for instance.

Figure 2:
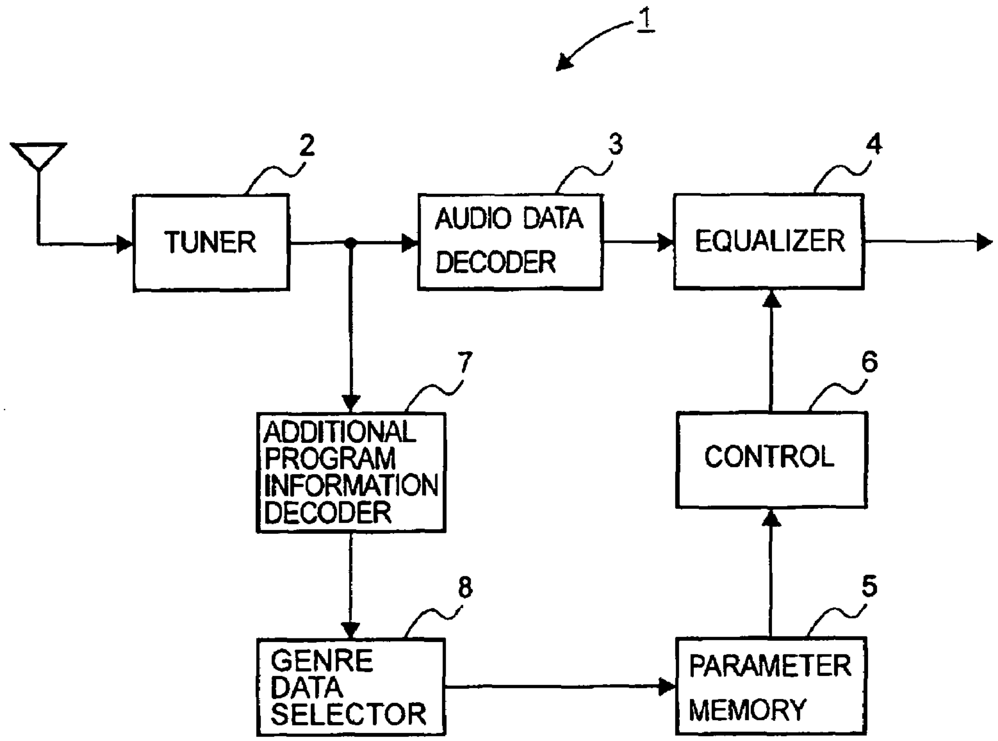
FIG. 2 is a block diagram of a digital radio broadcasting receiver in accordance with the first embodiment of the present invention.

FIG. 2 is a block diagram of a digital radio broadcasting receiver in accordance with the first embodiment of the present invention.

Digital broadcasting receiver 1 includes antenna 100, tuner 2, audio data decoder 3, equalizer 4, parameter memory 5 and control CPU 6. Tuner 2 selects a desired channel from the digital broadcasting signal received through antenna 100 and audio data decoder 3 decodes audio data from the channel data output from tuner 2. Equalizer 4 changes frequency characteristics of the audio data supplied from audio data decoder 3. Parameter memory 5 stores parameters to set up frequency characteristics provided to equalizer 4 corresponding to a musical genre of a transmitting composition. CPU 6 controls to provide equalizer 4 with a specific genre parameter read from parameter memory 5.

Equalizer 4 includes a digital filter composed of a digital signal processor (DPS), for example, which changes a filtering characteristic of the digital filter in response to the parameter provided through CPU 6.

Figures 3, 4:
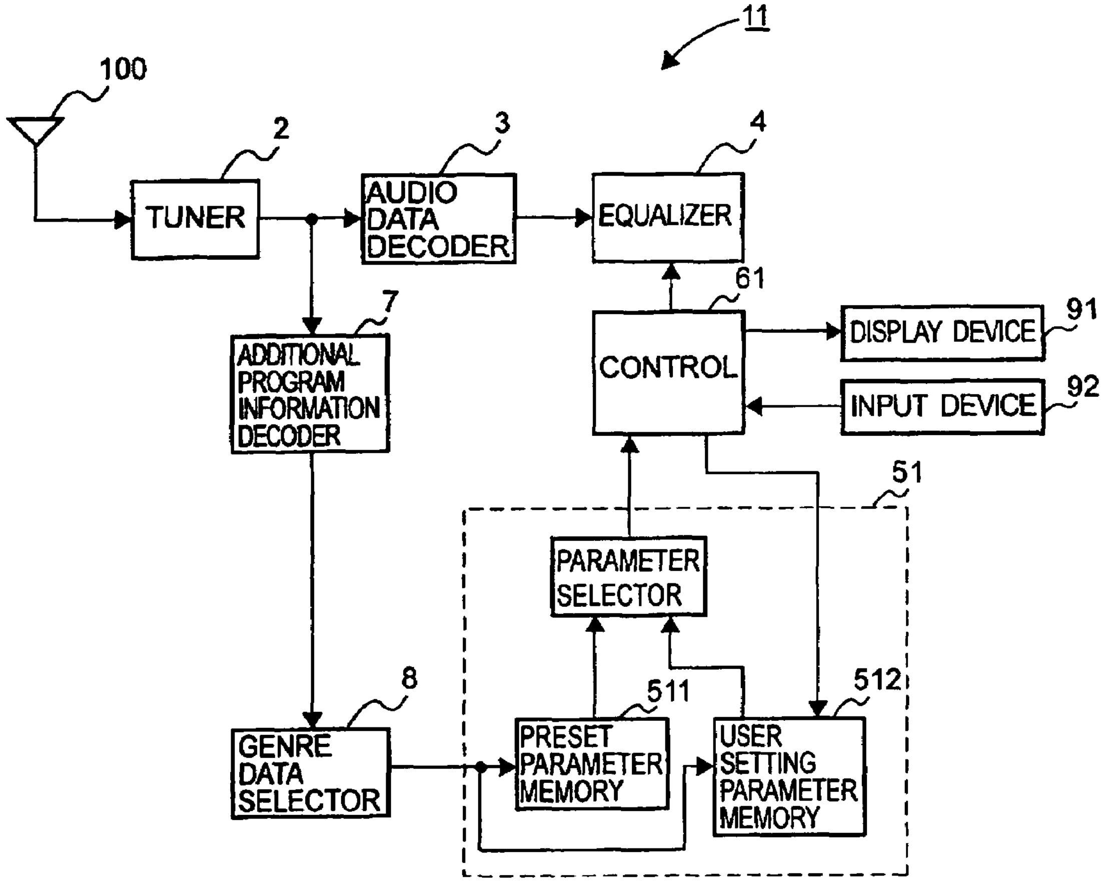
FIG. 3 is an allocation diagram of data stored in a parameter memory of the digital radio broadcasting receiver in accordance with the first embodiment of the present invention.
FIG. 4 is a block diagram of a digital radio broadcasting receiver in accordance with the second embodiment of the present invention.

FIG. 3 shows an example of data stored in parameter memory 5.

Parameter memory 5 stores each parameter per musical genre provided to equalizer 4. Here, such a parameter stored in parameter memory 5 is fixed preset data prepared in advance.

As shown in FIG. 3, preset data P1, P2, P3, P4, P5, . . . , for example, stored in parameter memory are allocated to musical genres corresponding to classic, piano, rock, Latin, jazz, . . . , respectively.

Digital radio broadcasting receiver 1 further includes additional program information decoder 7 and genre data selector 8. Additional program information decoder 7 decodes additional program information in a channel output from tuner 2 and supplies its character information. Genre data selector 8 selects musical genre data from the character information.

In other words, genre data selector 8 selects musical genre data from the additional program information decoded as character information in case of a broadcasting musical program and provides the same to parameter memory 5. In response to the musical genre data, parameter memory 5 reads out a parameter corresponding thereto and sends the same to CPU 6, which, in turn, supplies the corresponding parameter to equalizer 4. Equalizer 4 changes frequency characteristics of the broadcasting audio data in response to the parameter.

Thus, the frequency characteristics of audio reproduced through digital radio broadcasting receiver 1 are automatically adjusted in accordance with a broadcasting musical genre so that the reproduced audio improves in quality.

Second Embodiment

FIG. 4 is a block diagram of a digital radio broadcasting receiver in accordance with the second embodiment of the present invention.

Digital radio broadcasting receiver 11 is provided with display and input devices added to digital radio broadcasting receiver 1 so that users can freely change the frequency characteristics of equalizer 4. Since the same numeral blocks of FIG. 4 as those of FIG. 2 have the same functions, their explanations in detail are omitted here.

In digital radio broadcasting receiver 11, display device 91, input device 92 and parameter memory 51 are connected to control CPU 6. Display device 91 indicates a monitor screen used for setting frequency characteristics of equalizer 4. Input device 92 provides setting data for the frequency characteristics of equalizer 4. Parameter memory 51 stores parameters provided to equalizer 4.

Control CPU 61 calculates parameters base on the setting data of frequency characteristics supplied through input device 92.

Parameter memory 51 has preset parameter memory 511, user setting parameter memory 512 and parameter selector 513. Preset parameter memory 511 stores fixed parameters prepared in advance for every musical genre. User setting parameter memory 512 stores parameters calculated by control CPU 61 in accordance with the setting data of frequency characteristics supplied through input device 92. Parameter selector 513 selects either one of the parameters stored in preset parameter memory 511 or user setting parameter memory 512 and sends the same to control CPU 61.

Data structure of preset parameter memory 511 is the same as that of parameter memory 5 shown in FIG. 1 in which preset data for each genre are stored in pairs with a genre name.

Figures 5, 6:
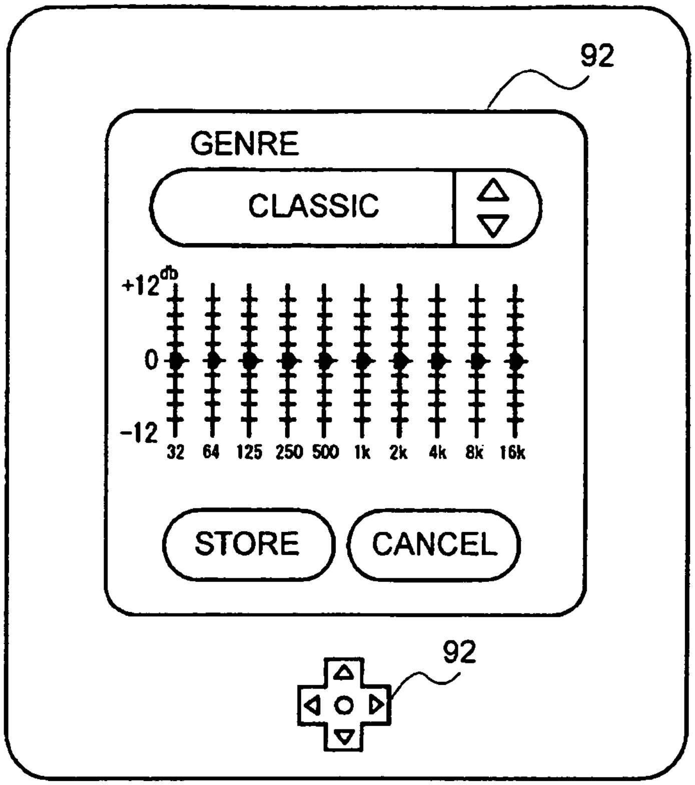
FIG. 5 shows an arrangement of display and input devices of the digital radio broadcasting receiver in accordance with the second embodiment of the present invention.
FIG. 6 is an allocation diagram of data stored in a user setting parameter memory of the digital radio broadcasting receiver in accordance with the second embodiment of the present invention.

FIG. 5 schematically shows an arrangement example of display and input devices 91 and 92 of the digital radio broadcasting receiver.

Display device 91 is composed of a liquid crystal display device, for example, which displays on its screen the selection of genre names or the set of a reproduction level for each frequency band, or an input cursor or buttons.

Input device 92 is a cross key, for instance, configured to move the cursor up or down, or right or left, select a genre desired to set frequency characteristics of equalizer 4, set a reproduction level for each frequency band. Frequency character data set are displayed on display device 91 and are input to control CPU 6 by the click of a store button of input device 92.

FIG. 6 is an allocation diagram of data stored in user setting parameter memory 512.

User setting parameter memory 512 is also basically of the same structure as preset parameter memory 511 and stores parameters for each genre corresponding to frequency characteristics set by users.

In the case that a user sets frequency characteristics of equalizer 4 for classical music and piano genres, for example, parameters for the classical music and piano genres are stored as user setting data U1 and U2 for the classical music and piano genres, respectively. If the user does not set any frequency characteristics for rock music genre, a data region allocated to parameters for the rock music genre is made blank.

User setting parameter memory 512 is composed of a non-volatile memory so that the user setting data stored may not be erased even if a power source for digital radio broadcasting receiver 11 is turned off.

In digital radio broadcasting receiver 11 of this embodiment, additional program information output from tuner 2 is supplied to additional program information decoder 7, which, in turn, decodes the same into character information. The additional program information decoded into such character information is provided to genre data selector 8, which selects a musical genre when the broadcasting program is musical. Data of the musical genre are sent to parameter memory 51.

The data of the musical genre sent to parameter memory 51 are further provided to preset parameter memory 511 and user setting parameter memory 512.

Preset parameter memory 511 outputs parameters for the musical genre input. Further, user setting parameter memory 512 also outputs parameters for the musical genre input in the event that user setting parameter memory 512 has already stored the same. User setting parameter memory 512, however, does not output any parameters for the musical genre input if user setting parameter memory 512 has not stored the same.

Parameter selector 513 selectively gives priority to user setting parameter memory 512 when both preset parameter memory 511 and user setting parameter memory 512 output parameters, and sends the parameter from user setting parameter memory 512 to control CPU 61.

When user setting parameter memory 512, however, does not output any parameters, parameter selector 513 sends the parameter from preset parameter memory 511 to control CPU 61.

In other words, when genre data selector 8 selects a genre of classical music, parameter selector 513 outputs user setting parameters U1 stored in user setting parameter memory 512 as shown in FIG. 6. When genre data selector 8, however, selects a genre of rock music, parameter selector 513 outputs preset data P1 stored in preset parameter memory 511 as shown in FIG. 3.

In such way, parameter selector 513 outputs the parameters to control CPU, which, in turn, provides the same to equalizer 4.

Thus, the frequency characteristics of audio reproduced through digital radio broadcasting receiver 11 are automatically adjusted in response to user setting data for each genre of an ongoing broadcasting musical composition.

According to the digital radio receiver of the embodiments, since users can freely set frequency characteristics of the equalizer, audio frequency characteristics are automatically adjusted in response to user setting data for each musical genre of an ongoing broadcasting musical composition.

It should be noted that equalizer 4 may be more generally substituted for any other audio field adjustors configured to control audio fields of the audio data decoded through audio data decoder 3. In other words, in addition to being frequency characteristics, the audio fields may be sound volumes which the audio field adjustor automatically sets in response to musical genres or programs. Thus, for example, the audio field adjustor may increase sound volumes in classical music but decrease those in rock and/or commercial music.

The present invention is not limited to the embodiments but may be subjected to various modifications without departing from the scope of the invention defined in the attached claims.

In the foregoing description, certain terms have been used for brevity, clearness and understanding, but no unnecessary limitations are to be implied therefrom beyond the requirements of the prior art, because such words are used for descriptive purposes herein and are intended to be broadly construed. Moreover, the embodiments of the improved construction illustrated and described herein are by way of example, and the scope of the invention is not limited to the exact details of construction. Having now described the invention, the construction, the operation and use of embodiments thereof, and the advantageous new and useful results obtained thereby; the new and useful construction, and reasonable equivalents thereof obvious to those skilled in the art, are set forth in the appended claims.

What is claimed is:

1. A digital radio broadcasting receiver comprising:

a tuner configured to receive digital radio broadcasting programs and to output audio data and additional program information;

an audio data decoder to decode the audio data output from the tuner;

an audio field adjustor configured to adjust audio fields of the audio data decoded through the audio data decoder;

a parameter memory to store parameters to adjust audio field for each musical genre;

an additional program information decoder to decode the additional program information output through the tuner and convert the same into character information;

a genre data selector to select a musical genre from the character information provided through the additional program information decoder; and a controller configured to control the parameters read from the parameter memory in response to the musical genre selected by the genre data selector and to send the same to the audio field adjustor.

2. A digital radio broadcasting receiver according to claim 1, wherein the parameter memory includes a preset parameter memory to store predetermined parameters in advance and a user setting parameter memory to store parameters set by users.

3. A digital radio broadcasting receiver according to claim 2, further comprising an input device to set the parameter in the user setting parameter memory.

4. A digital radio broadcasting receiver according to claim 2, 3, or 3, wherein the audio field adjustor is an equalizer.

5. A method of receiving digital radio broadcasting, comprising:

receiving digital radio broadcasting programs and outputting audio data and additional program information;

decoding the audio data;

storing parameters in a parameter memory to adjust audio field for each musical genre;

decoding the additional program information and converting the same into character information;

selecting a musical genre from the character information;

reading the parameters from the parameter memory in response to the musical genre selected; and adjusting the audio field of the audio data decoded in response to the parameters read from the parameter memory.

* * * * *